United States Patent [19]

Sbarro

[11] Patent Number: 5,056,871
[45] Date of Patent: Oct. 15, 1991

[54] STRUCTURE WITH MULTIPLE INDEPENDENT WHEELS FOR CYCLE OR ENGINE-DRIVEN VEHICLE

[75] Inventor: Franco Sbarro, Tuileries-de-Grandson, Switzerland

[73] Assignee: SM Sbarro Mottas Engineering S.A., Switzerland

[21] Appl. No.: 536,685
[22] PCT Filed: Nov. 1, 1989
[86] PCT No.: PCT/CH89/00192
 § 371 Date: Jun. 29, 1990
 § 102(e) Date: Jun. 29, 1990
[87] PCT Pub. No.: WO90/05069
 PCT Pub. Date: May 17, 1990

[30] Foreign Application Priority Data

Nov. 2, 1988 [FR] France .................. 88 14528

[51] Int. Cl.[5] .................. B60B 11/08; B62D 49/06
[52] U.S. Cl. .................. 301/36 R; 301/5 R
[58] Field of Search .............. 301/36 R, 135 M, 13 R, 301/36 A, 36 WP, 5 R, 1

[56] References Cited

U.S. PATENT DOCUMENTS

| 1,340,414 | 5/1920 | Schneider | 301/36 R |
| 1,406,122 | 2/1922 | Welch | 301/64 R |
| 1,426,587 | 8/1922 | Micha | 152/246 |
| 1,809,699 | 6/1931 | Higbee | 301/36 A |
| 1,887,544 | 11/1932 | Codd | 301/36 R X |
| 1,979,598 | 11/1934 | Ash | 301/36 A |
| 2,273,630 | 2/1942 | Dunham et al. | 180/21 X |
| 3,432,124 | 3/1969 | Lucien | 301/36 R X |
| 4,943,101 | 7/1990 | Chapman | 301/36 R X |

FOREIGN PATENT DOCUMENTS

| 771427 | 11/1934 | France . |
| 773830 | 11/1934 | France . |
| 841841 | 5/1939 | France . |
| 2526746 | 11/1983 | France . |
| 0270496 | 8/1989 | German Democratic Rep. ... 301/36 R |
| 765034 | 7/1981 | U.S.S.R. . |

Primary Examiner—Russell D. Stormer
Attorney, Agent, or Firm—Davis, Bujold & Streck

[57] ABSTRACT

The present invention relates to a structure with multiple independent wheels for cycles or engine-driven vehicles which run on an irregular bearing surface. The structure is comprised of two twin wheels (10, 11) which are interconnected by two toggle-levers (12). Each of the two wheels (10 and 11) is comprised of a central part (13) and a peripheral part (14). The central part is fixed and the peripheral part rotates and is concentric with the central part. Both parts (13 and 14) are coupled to each other by a crown-shaped roller bearing (15) which is comprised of an inner annular element (16) and a rotary outer annular element (17). The two levers (12) are connected to the suspension by arms (20). The device provides an optimum adherence to road surfaces.

8 Claims, 3 Drawing Sheets

STRUCTURE WITH MULTIPLE INDEPENDENT WHEELS FOR CYCLE OR ENGINE-DRIVEN VEHICLE

The present invention concerns a structure with multiple independent wheels for a motorized or engine-driven vehicle designed to travel on an irregular surface, each wheel comprising a central portion connected to the base structure of the vehicle and a peripheral portion concentric to the said central portion and disposed to rotate around the latter, wherein the said central portion and the said peripheral portion are connected during at least one rotation, comprising at least one interior annular element joined to the said central portion and at least one exterior annular element concentric to the said interior annular element and joined to the said peripheral portion, the latter supporting a tire appropriate for the type of surface on which the vehicle will move, and wherein the said central portion is connected to the base structure of the vehicle at off-center connection points on the wheel.

Many utilitarian vehicles, road bikes or specialized vehicles for lumber yards or shipyards consist of dual tires which offer several advantages over single tires. First, the risk of accident after a tire puncture is considerably reduced by the fact that the wheels in a pair of dual wheels generally are not simultaneously overturned after a puncture. Second, the cost of two standard narrow tires is cheaper than that of one double width tire. These benefits are well known and are taken advantage of by manufacturers However, they are mitigated to some degree by problems essentially arising from the fact that in all known constructions, dual wheels are connected to each other either because their rims are joined, or because they are mounted on the same rigid axis In actuality, when one of the tires lifts up because of a bump in the road surface, the other wheel automatically lifts, as it is connected to the first, even if the bump does not extend as far as the second tire. The result is a momentary simultaneous loss of adherence in both tires. This phenomena is continuously repeated along the road surface, resulting in decreased traction due to repeated loss of adherence, thereby causing constant jerkiness in the wheels.

Present manufacturing methods do not solve this problem.

The present invention proposes to overcome these disadvantages by achieving a structure of multiple independent wheels as defined above providing continuous contact between the tires and the underlying surface, under any conditions of vehicle use or whatever the condition and nature of the surface with which it is in contact.

This goal is attained by the structure according to the invention, characterized in that the independent wheels are connected two by two by at least two diametrically opposed rocker arms articulated at one of their extremities to an off-center anchoring point on one of the independent wheels, and at the other extremity to an off-center anchoring point on another of said independent wheels, and in that the said rocker arms are affixed by means of pivoting elements, either directly or by means of rocker arms with two coupling arms connected to the base structure of the vehicle.

According to a preferred embodiment, the independent wheels consist of a pair of dual wheels connected to each other by two diametrically opposed rocker arms and articulated at one of their extremities of an off-center anchoring point on one of the dual wheels and at the other extremity to an off-center anchoring point on the other of the dual wheels, and by the fact that the said rocker arms are attached by means of pivoting elements to the said coupling arms connected to the base structure of the vehicle.

The said coupling arms further constitute the suspension means for the vehicle.

The said pivoting means are preferably equidistant from the said off-center anchoring points on the independent wheels and are preferably staggered in relation to the rocker arm.

According to another embodiment, the exterior annular elements of the bearings of the dual wheels are joined to each other by means of a small connecting rod, the extremities of which are respectively articulated to the said exterior annular element associated with one of the wheels and with the said exterior annular element associated with the other wheel.

In an advantageous embodiment, the exterior annular element associated with one of the independent wheels may be connected to a drive mechanism by means of three small connecting rods attached at one of their extremities to three points on the said exterior annular element.

The present invention will be better understood with reference to the description of one exemplary embodiment and to the attached drawing, wherein.

Figure 1:
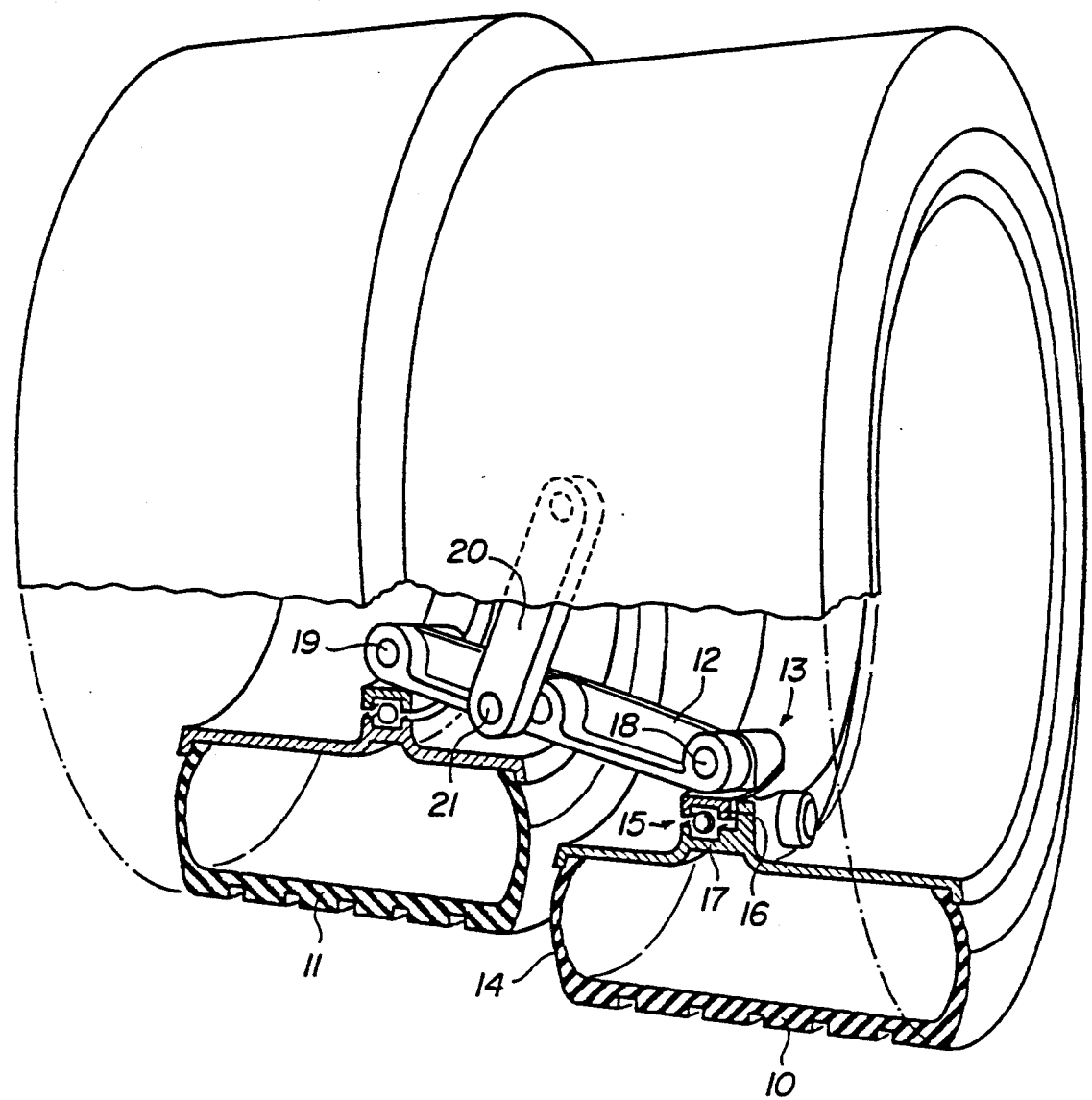
FIG. 1 represents a perspective view illustrating a preferred embodiment of the independent wheel structure according to the invention, the wheels being unengaged.

With reference to FIG. 1, the independent wheel structure shown corresponds to two dual wheels 10 and 11 interconnected by two rocker arms 12 (only one of which is visible in the drawing) which are diametrically opposed, or preferably by two pairs of rocker arms as is shown in more detail in FIGS. 3 through 6. Each of wheels 10 and 11 comprises a central portion 13 and a peripheral portion 14 concentric to central portion 13, said two portions being interconnected by a crown bearing 15. Said bearing 15 comprises an interior annular element 16 comprising one of the components of central portion 13 and an exterior annular element 17 constituting one of the components of peripheral portion 14.

Rocker arms 12 actually connect the two respective central portions 13 of the two wheels 10 and 11 by means of two articulated portions 18 and 19. A shaft 20 is articulated at one end by means of a pivoting element 21 to one of the two rocker arms, and at its other extremity, either by means of a corresponding device on the other rocker arm 12 or directly, to an axis or suspension shaft connected to the vehicle chassis. In use, each rocker arm 12 corresponds to a shaft 20 which is preferably rigidly mounted on a supporting axle of the wheel structure affixed to the vehicle chassis. This connection will be described in greater detail with the reference to FIGS. 3 through 6.

Figure 2:
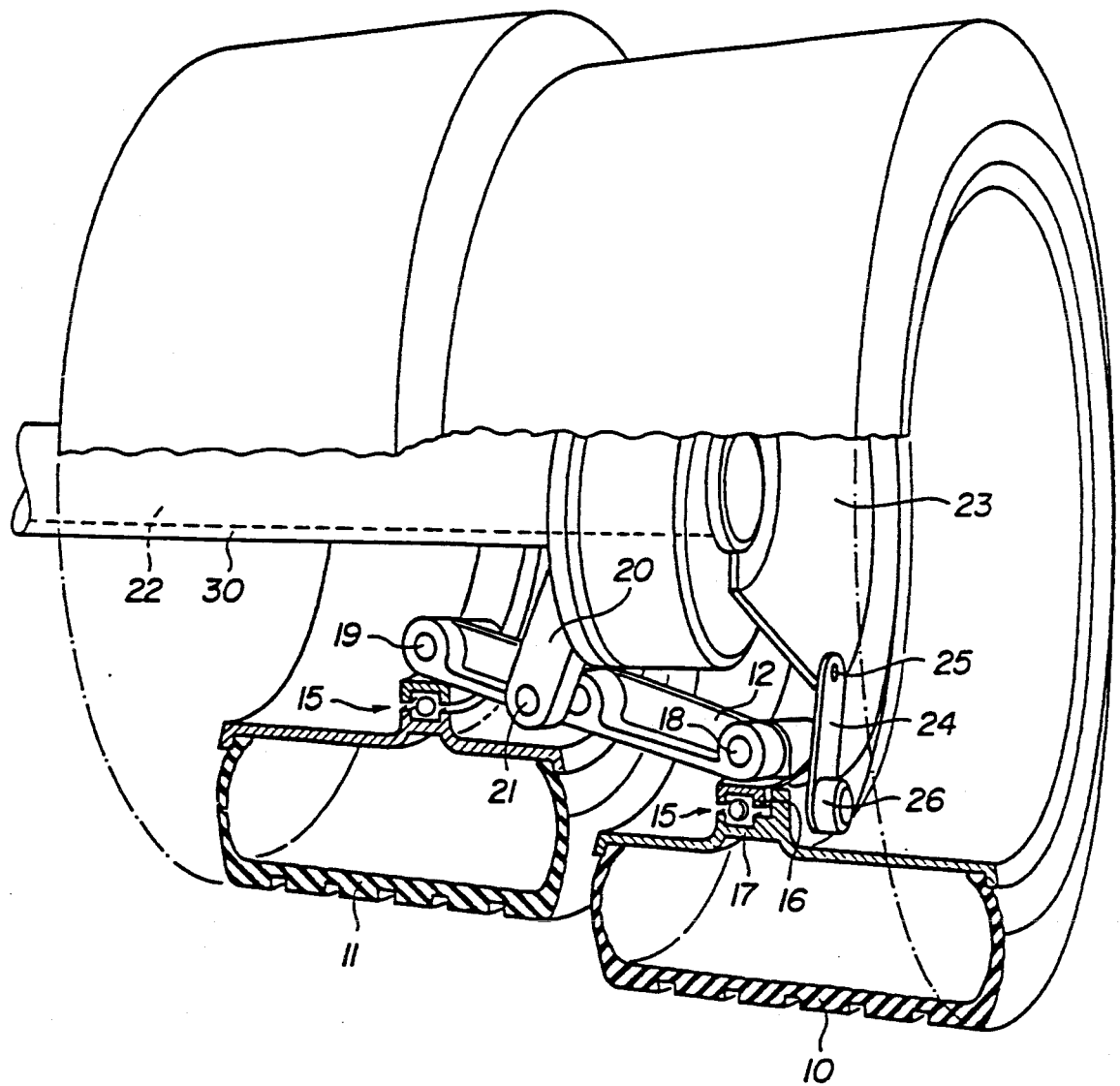
FIG. 2 represents a perspective view similar to that of FIG. 1, wherein the wheels are engaged.

FIG. 2 shows a variation of the wheel structure shown in FIG. 1, wherein exterior wheel 10 is a motor driven wheel. As before, the structure comprises two diametrically opposed rocker arms 12, respectively, connected by articulations 18 and 19 to interior annular elements 16 of bearings 15 on each of the wheels. The two diametrically opposed rocker arms 12 are respectively connected by two shafts 20, articulated by means of pivoting elements 21 to suspension means 30 which may be associated with a drive shaft 22 for driving a hub or a disc 23 designed to transmit rotation torque to drive wheel 10. The rotation torque is preferably transmitted by a flange 23 to which there is attached a small connecting rod 24 articulated at one extremity to point 25 and at its other extremity to a point 26 disposed along the exterior annular element 17 of bearing 15 on wheel 10.

This form of embodiment is given by way of example and illustrates in particular the drive mode of the exterior wheel of wheel structures 10–11 by means of a sole connecting rod which connects any element, perhaps a disc or a hub, connected to a drive shaft, to the rim of the wheel which is itself connected to the exterior annular element of the wheel bearing.

In the two forms of embodiments described with reference to FIGS. 1 and 2, the wheel coupling is affected by means of two diametrically opposed rocker arms. This embodiment makes it necessary for the rocker arms and articulation points to be very strongly built, thereby presenting problems when lightweight construction is desired, particularly for racing vehicles.

Figure 3:
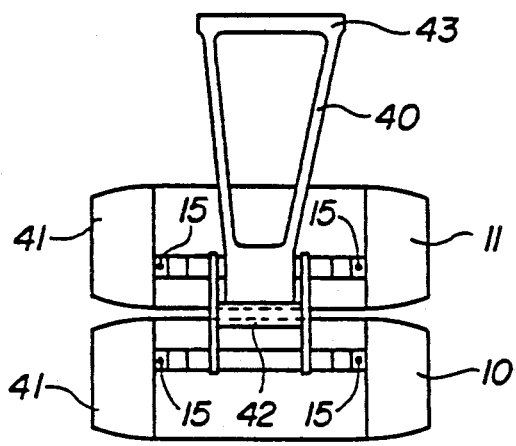
FIG. 3 represents a schematic overview of a wheel structure according to the invention wherein the wheels are not the drive wheels.
Figure 4:
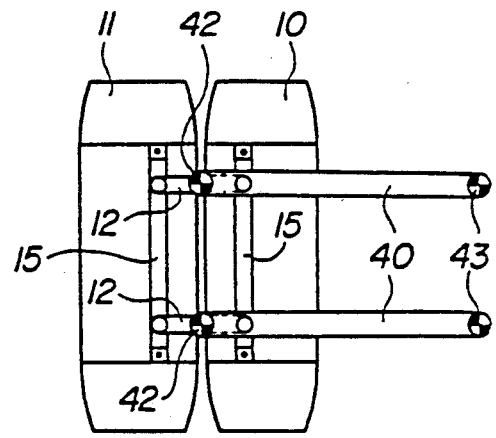
FIG. 4 is a frontal view of the structure shown in FIG. 3.
Figure 5:
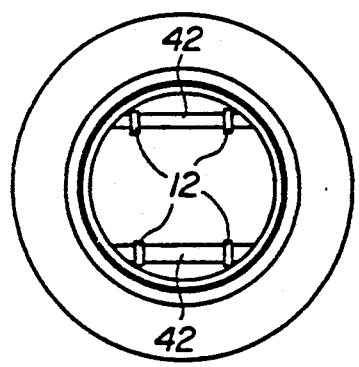
FIG. 5 is an elevational view of the same structure of FIGS. 3 and 4.

The embodiment shown in FIGS. 3, 4 and 5 meet these requirements. As before, these structures shown comprises two dual wheels 10 and 11 each having a fixed central portion connected to a suspension shaft 40, and a rotating peripheral portion concentric with respect to the central portion, these two portions being interconnected by a crown bearing. Said bearings 15 ensure the connection between the fixed central portion of the wheel and the rotatable peripheral portion consisting of the rim and a tire 41 mounted thereon The fixed interior portions of wheels 10 and 11 are connected to each other by four rocker arms 12 in diametrically opposed pairs, which are connected in twos by a rigid coupling bar 42.

In principle these four rocker arms function identically in all respects to the two rocker arms of the structures shown in FIGS. 1 and 2. The division between the lower rocker arm and the upper rocker arm permits a much less rigid, more effective construction while using lighter, less sturdy elements The two connection bars 42 allow the dual wheel structure to be attached to two suspension arms 40 articulated at two points 43 to the vehicle chassis.

Figure 6:
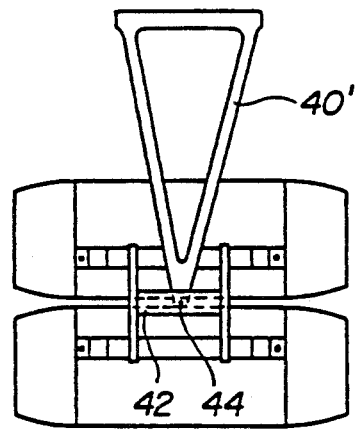
FIG. 6 is a view similar to that of 3 but corresponds to the drive wheels.

In the case of a structure for wheels other than drive wheels, the suspension shafts 40 are attached to connecting bars 42 along essentially their entire length, or at least two points which are preferably widely spaced apart from each other. In the case of a structure for drive wheels as shown in FIG. 6, the suspension shafts 40' are connected to connecting bars 42 at a point 44 defining a pivoting axle for the wheels in relation to the suspension shafts. All other elements shown in this drawing are strictly identical to the corresponding elements in FIG. 3 and will not be described in any further detail hereinafter.

Taking into consideration the foregoing description of the corresponding drawings, it will readily be understood that the dual wheel structure according to the invention ensures quasi-total independence of the two interconnected wheels. Therefore, if one of the wheels lifts up because of an irregularity in the road surface, the other wheel continues on its path independently of the first. Not only does the latter wheel remain in contact with the road surface, but the tire of the wheel remaining in contact with the surface has improved adherence due to the fact that the first wheel, having lost contact with the road surface, momentarily engenders additional nonbearing weight, thereby increasing pressure of the tire of the wheel remaining in contact with the road surface. Generally, the connection points of the different rocker arms and the suspension elements are located essentially at the center of the rocker arms. However, to achieve certain special effects and particularly to favor one of the dual wheels over the other, the said articulation point may be displaced to one or the other side of the center of rocker arms 12. When more than 50% of the vehicle weight must rest on the exterior wheels, the articulation point would be moved towards the outside. In the opposite case, the articulation point would be moved towards the inside in relation to the center or the rocker arms.

Figure 7:
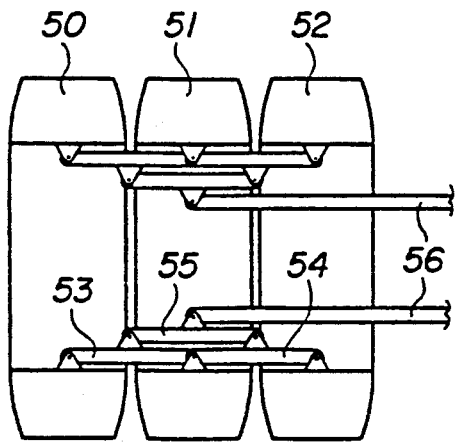
FIG. 7 is a schematic representation of a structure with three connected wheels.

The principle described in detail with reference to the construction of dual wheels may also, of course, be applied to wheel structures comprising more than two wheels. FIG. 7 illustrates, by way of example, an embodiment comprising three independent wheels connected to each other by means of rocker arms, and FIG. 8 illustrates an embodiment comprising four independent wheels connected to each other by means of rocker arms.

With reference to FIG. 7, the structure shown comprises three independent wheels 50, 51 and 52. Wheels 50 and 51 are preferably connected to each other by four rocker arms 53 which are diametrically opposed two by two. Wheels 51 and 52 are also connected to each other by four rocker arms 54 identical to rocker arms 53. The rocker arms 53 and the rocker arms 54 are coupled respectively to each other by four rocker arms 55 which are attached to two suspension arms 56. The different rocker arms are mounted in the same manner as are rocker arms 12 previously described.

Figure 8:
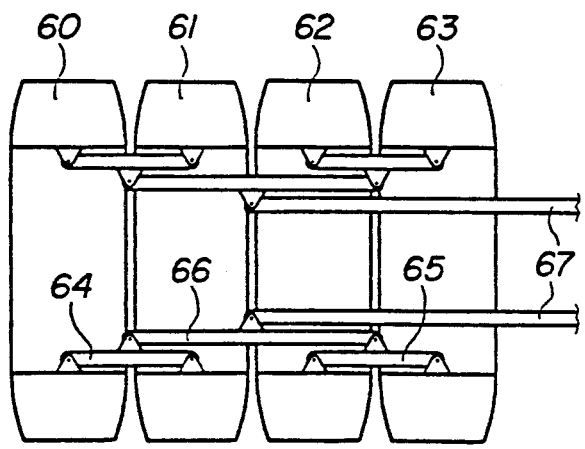
FIG. 8 is a schematic representation of a structure comprising four interconnected independent wheels.

In the case of FIG. 8, the structure comprises four independent wheels 60, 61, 62 and 63. Independent wheels 60 and 61 are connected to each other by four rocker arms 64. Independent wheels 62 and 63 are connected to each other by for rocker arms 65. Rocker arms 64 and 65 are respectively connected to each other by four rocker arms 66 which are attached two by two to two suspension arms 67. Such a structure may be best suited to a larger number of wheels, thereby offering advantages for specialized vehicles, particularly all terrain vehicles or vehicles designed for use in swampy areas where a classic four wheel motorized vehicle has too little contact surface to prevent it from sinking into the terrain.

For motorized wheels, one of the dual wheels is connected by means of three small connecting rods to the drive mechanism of the vehicle.

In all cases, the rocker arm system provides for optimal adherence of the tires to the contact surface whatever the nature of the surface and the load supported by the vehicle.

What is claimed is:

1. A structure with multiple independent wheels for a motorized driven vehicle designed to move on an irregular surface, each wheel comprising a central portion (13) connected to the base structure of the vehicle and a peripheral portion (14) concentric with respect to said central portion and disposed to rotate thereabout, wherein said central portion and said peripheral portion are connected to each other by at least one bearing (15) comprising at least one interior annular element (16) connected to said central portion and at least one exterior annular element (17) concentric to said interior annular element and connected to said peripheral portion, said peripheral portion (14) having a tire appropriate for the type of surface on which the vehicle will travel, and wherein said central portion of each independent wheel is connected to the base structure of the vehicle by two anchor points (18, 19) which are off-center of the wheel, characterized in that at least one of said multiple independent wheels (10, 11, 50, 51, 52, 60, 61, 62, 63) is connected side by side with at least one other wheel (10, 11, 50, 51, 52, 60, 61, 62, 63) by at least two diametrically opposed rocker arms (12), each of said at least two diametrically opposed rocker arm is articulated at a first end thereof to one of the two anchoring points (18) of a first of the side by side wheels, and a second end of each of said at least two diametrically opposed rocker arms is articulated to one of the two anchoring points (19) of the other of the side by side wheels, and said rocker arms are connected to the base structure of the vehicle by pivoting elements (21).

2. A structure according to claim 1, characterized in that the independent wheels comprise a pair of dual wheels (10, 11) connected to each other by said at least two diametrically opposed rocker arms (12), and said pivoting elements (21) are connected with the base structure of the vehicle via coupling arms (20).

3. A structure according to claim 2, characterized in that the said coupling arms (20) comprise suspension arms (40, 56, 67) of the vehicle.

4. A structure according to claim 1, characterized in that the said pivoting elements (21) are connected to said rocker arms at a position equidistant from said anchoring points (18, 19) of the independent wheels to which said rocker arms are attached.

5. A structure according to claim 1, characterized in that the said pivoting elements (21) are connected to said rocker arms at a position spaced from the center between said anchoring points (18, 19) of the independent wheels to which said rocker arms are attached.

6. A structure according to claim 2, characterized in that the exterior annular elements (17) of the bearings (15) of the pair of dual wheels are connected to each other by means of a small connecting rod (24), the extremeties of which are respectively articulated to the said exterior annular element (17) associated with one of the wheels and with the said exterior annular element (17) associated with the other wheel.

7. A structure according to claim 1, characterized in that the exterior annular element of one of the independent wheels is connected to a drive mechanism via at least one connecting rod for transmitting driving power to the vehicle.

8. A structure according to claim 1, characterized in that coupling means are provided for interconnecting said pivoting elements (21) with the base structure of the vehicle.

* * * * *